United States Patent [19]
Acker

[11] 3,839,673
[45] Oct. 1, 1974

[54] PRECISE FREQUENCY MEASURING ANALOG CIRCUIT

[75] Inventor: William F. Acker, Seminole, Fla.

[73] Assignee: Honeywell Information Systems Inc., Waltham, Mass.

[22] Filed: June 7, 1973

[21] Appl. No.: 367,933

Related U.S. Application Data
[63] Continuation of Ser. No. 150,324, June 7, 1971, abandoned.

[52] U.S. Cl.............. 324/78 E, 324/78 F, 320/1, 307/251
[51] Int. Cl........................................... G01r 23/02
[58] Field of Search....... 324/78; 307/251; 328/140; 307/233; 320/1

[56] References Cited
UNITED STATES PATENTS

| | | | |
|---|---|---|---|
| 3,219,940 | 11/1965 | Cooke-Yarborough........... | 324/78 E |
| 3,466,526 | 9/1969 | Cole.............................. | 324/78 E |
| 3,502,905 | 3/1970 | Bicking............................ | 307/251 |
| 3,594,589 | 7/1971 | Hall................................. | 307/251 |

FOREIGN PATENTS OR APPLICATIONS

| 1,086,671 | 10/1967 | Great Britain..................... 324/78 J |
|---|---|---|

Primary Examiner—Alfred E. Smith
Attorney, Agent, or Firm—Ronald T. Reiling; Nicholas Prasinos

[57] ABSTRACT

A precise frequency measuring analog circuit for accurately measuring the unknown frequency of an electronic signal. The incoming signal alternately triggers two electronic switches which permit the charging from an accurate voltage source of a capacitor of a predetermined value and the discharging thereof, in accordance with a frequency of the incoming signal. A circuit coupled to the capacitor transfers a precise quantity of charge into the capacitor and then out to an RC circuit during each cycle of the input signal. The current thus transferred to the RC circuit produces a voltage across R which is proportional to the unknown frequency.

11 Claims, 1 Drawing Figure

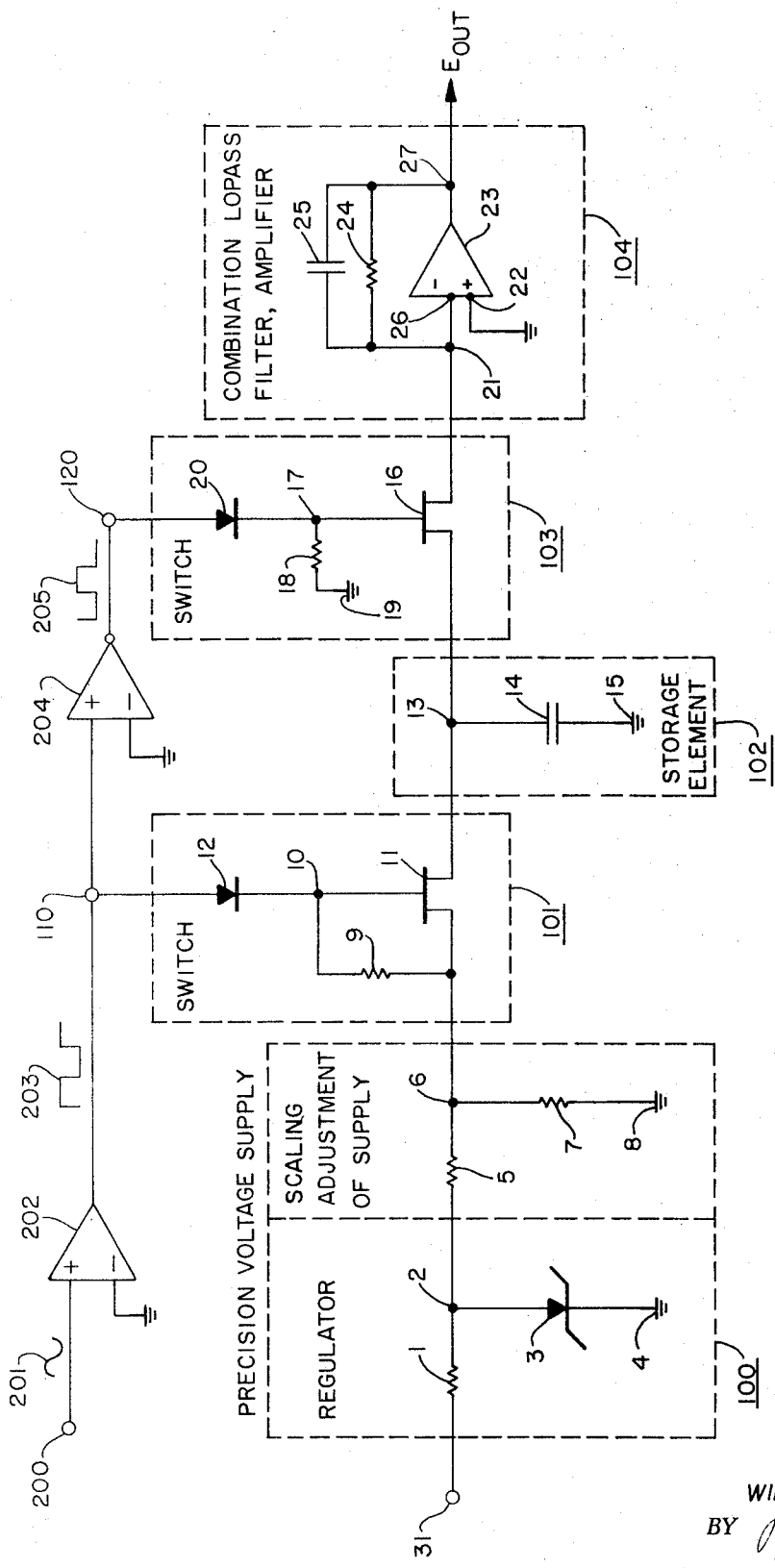

3,839,673

PRECISE FREQUENCY MEASURING ANALOG CIRCUIT

This is a continuation, of application Ser. No. 150,324, filed June 7, 1971 and now abandoned.

BACKGROUND OF THE INVENTION

1. Field of the Invention

This invention relates to electronic measuring circuits and more particularly to a precise frequency measuring analog circuit in the range of 0 to 100 Hertz.

2. Description of the Prior Art

In the prior art, electronic frequency measuring techniques have been utilized in tachometers, such as are used, for example, in automobiles. These prior art techniques typically employ a circuit which triggers a substantially constant pulse-width, substantially constant pulse-height one-shot circuit each time an input pulse is received. The DC average of this pulse train is used to indicate the input frequency.

Hence in prior art systems, a fixed current is applied for a fixed time through a low pass filter to a capacitor. In order to obtain an output which is linearly proportional to the input frequency one prior art technique utilizes an integrator which is turned on by one pulse, integrates until the next pulse and is then turned off. This technique produces a voltage which is proportional to the distance between two events, and by measuring the time between these two events the frequency is determined.

One major objection to this system is that as the time approaches zero the system tends to infinity and an inaccurate or even no measure is made at zero frequency.

Another disadvantage to prior art systems is that two variables — voltage and time — must be precisely controlled. Therefore, in addition to an accurate current source, an accurate clock is required. Moreover, both these devices require accurate initial calibration.

Still a further disadvantage to prior art systems is the difficulty of obtaining very fast rise and fall times that are required to shape square waves which are truly square.

What is needed is a measuring circuit which substantially obviates the above difficulties and is reliable in operation down to zero frequencies, has fewer parts, requires a minimum of calibration and is relatively cheap to construct and maintain.

SUMMARY OF THE INVENTION

The invention herein disclosed comprises a precise frequency measuring analog circuit for accurately measuring an unknown frequency of an incoming electronic circuit, by providing an output voltage which is linearly proportional to the incoming frequency. The incoming frequency signal is reduced to square waves by techniques well known in the art. The incoming signal then alternately triggers two electronic switches which permit the charging from an accurate voltage source of a capacitor of a predetermined value and the discharging of same, in accordance with the frequency of the incoming signal. A circuit coupled to the capacitor transfers a precise quantity of charge per cycle to an RC circuit. The current is thus transferred to the RC circuit and hence the voltage across R is proportional to the number of cycles per second of the input signal.

OBJECTS

It is an object therefore of the instant invention to substantially obviate the hereinbefore described disadvantages of prior art devices.

It is another object of the invention to provide a simple and inexpensive precise frequency measuring analog circuit for accurately measuring the frequency of an incoming electronic signal.

More particularly it is a further object to provide a simple and inexpensive frequency measuring analog circuit for accurately measuring the frequency of an incoming electronic signal from 100 Hz down to 0 Hz or DC.

It is still another object of the invention to provide a precise frequency measuring analog circuit which requires a minimum of components, is reliable in operation, and requires a minimum of calibration.

It is still another object to provide a precise frequency measuring analog circuit requiring no clock.

Other objects and advantages of the invention will become apparent from the following description of a preferred embodiment of the invention when read in conjunction with the drawings contained herewith.

BRIEF DESCRIPTION OF THE DRAWINGS

FIG. 1 is a schematic diagram of the invention.

DESCRIPTION OF A PREFERRED EMBODIMENT

Referring now to FIG. 1 a precision voltage supply 100 is comprised of a voltage regulator and a scaling adjustment of the supply. The crudely regulated voltage supply source is connected at point 31 to resistor 1 typically 600 ohms, although any appropriate resistor may be utilized, which is coupled at junction 2 to the anode of a Zener diode 3. The cathode of the Zener diode 3 is coupled to ground 4. The scaling adjustment of the voltage supply is comprised of a voltage divider which in turn is comprised of resistor 5 which has one of its terminals coupled to junction 2 and the other of its terminals coupled to junction 6, and a second resistor 7 which has one of its terminals coupled to junction 6 and the other of its terminals coupled to ground 8.

An electronic switch 101 is coupled to the output of precision voltage supply 100, and is comprised of an input terminal 110 which is coupled to the anode of a diode 12. The cathode of diode 12 is coupled to the gate of a field effect transistor (FET) 11. The cathode of diode 12 is also coupled, via junction point 10 and resistor 9, to the source of FET 11. The drain of FET 11 is coupled to junction 13. A capacitor 14, typically 0.01 uF although any other appropriate value may be utilized, is coupled to junction 13 and also to ground 15.

A second switch 103 is also coupled to storage element 102 via junction 13. The second switch 103 is comprised of an input terminal 120 which is coupled to the anode of diode 20. The cathode of diode 20 is coupled to the gate of FET 16 and to ground 19 via junction point 17 and resistor 18. The source of FET 16 is coupled to the junction point 13 whereas the drain of FET 16 is coupled to the combination low pass filter, amplifier 104 at junction point 21. The combination filter, amplifier 104 is comprised of an operational/amplifier 23. (See copending application Ser. No. 52,035 assigned to same assignee as instant invention for description and reference to typical operational amplifier). The operational amplifier 23 has its inverting input terminal (negative symbol) terminal 26 coupled to junction 21. Its non-inverting input terminal (positive symbol) terminal 22 to coupled to ground. A resistor 24 is coupled in parallel with a capacitor 25 and the entire RC parallel circuit is coupled in parallel with the operational amplifier 23 at junctions 21 and 27.

Table 1 below illustrates typical values for the various components utilized in the invention but should be construed as limiting of the invention since other appropriate values can be utilized by those skilled in the art from a reading of the instant specification.

TABLE I

| Element Name and No. | Value | Units |
|---|---|---|
| Resistor (1) | 600 | ohms |
| Resistor (5) | 1,800 | ohms |
| Resistor (7) | 5000 | ohms |
| Resistor (9) | 2,200,000 | ohms |
| Capacitor (14) | 0.01 | microfarads |
| Resistor (18) | 1.00 | megohm |
| Resistor (24) | 1.00 | megohm |
| Capacitor (25) | 2.00 | microfarads |
| Zener Diode (3) | 6.8 | volts |

A comparator 202 is coupled to input terminal 200 at its non-inverting terminal, whereas the inverting terminal of comparator 202 is coupled to ground. The comparator is also coupled to the input terminal 110 of switch 101. Terminal 110 is also coupled to the inverting terminal of inverter 204, whereas the non-inverting terminal is coupled to ground. Inverter 204 is further coupled to the input terminal 120 of switch 103.

Operation of the Invention

Referring to FIG. 1 a signal 201 with unknown frequency, if not already a square wave type signal, is converted to a square wave type or rectangular type signal 203 by means well known in the art such as comparator 202 (See Copending application Ser. No. 34,934 filed 5-7-70 and assigned to the same assignee as the instant application for one typical technique. Also see U.S. Pat. to W. Strohmeier, No. 3,217,173). The rectangular type signal 203 is applied to the input terminal 110 of electronic switch 101 and then applied to an inverter 204 which applies the complementary signal 205 to terminal 120 of switch 103. The operating sequence of the frequency — measuring circuit is as follows: when terminal 110 or 120 is at a potential of +12 volts, then FET 11 or 16 respectively is biased into the non-conducting state. When the potential of either of these terminals is lowered to −12 volts the corresponding FET becomes conductive. When the input signal 201 becomes negative the potential on the first switch terminal 110 is dropped to −12 volts while the potential on second switch terminal 120 is raised to +12 volts. Switch 101 becomes conductive whereas switch 103 is non-conductive. A constant voltage of 5 volts from precision voltage supply 100 is impressed on the capacitor 14, and the capacitor which is for this embodiment 0.01 uF, acquires a charge of about 0.05 micro coulombs. On the next input signal transition the potential of the control terminal for switch 101 is raised to plus 12 volts while the potential of the control terminal for switch 103 is lowered to minus 12 volts. Hence, switch 103 is in the conducting state whereas switch 101 is non-conducting. While the two switches are in this condition, the operational amplifier 23 senses the voltage across capacitor 14 and drives this voltage to zero by pushing current through capacitor 25 substantially as follows: The charge from capacitor 14 is removed by bringing both terminals 13 and 15 to ground. Terminal 15 is already grounded and terminal 13 can be brought to ground by connecting it to terminal 21 thru FET 16. The inverting input 26 of operational amplifier 23 ideally has an infinite impedance and draws no current from terminal 21; however, operational amplifier 23 will operate to reduce the voltage at junction point 21 to match that at junction point 22 which is already grounded. It does, this by adjusting the voltage of junction 27 so as to force current through the capacitor 25 and capacitor 14 in series until the voltages at junctions 21 and 13 respectively reach ground. When this happens capacitor 14 has completely discharged and the same current required to discharge it also passed through capacitor 25 during the same interval of time; hence a charge equivalent to that on capacitor 14 has been transferred to capacitor 25. Therefore for each cycle a fixed charge is transferred to capacitor 25 from capacitor 14. The more cycles per unit time the more charge per unit time is transferred; hence the current is proportional to the number of cycles per second.

When sufficient time has elapsed for this operation to be completed, the potential on the second switch 103 is raised back to plus 12 volts and the circuit is ready for another cycle. Assuming that all of the time constants and duty cycles have been appropriately chosen (and those shown in table 1 are correct for this particular embodiment) and that the frequency of the switch control input signal is not excessive, each cycle will transfer the same amount of charge (approximately 0.05 micro coulombs) to capacitor 25. Assuming that there are F cycles of the switches per second the quantity of charge transferred to capacitor 14 in one second is F X 0.05 micro coulombs which is equal to an average current of 0.05F microamperes. This 0.05 F microampere current discharges slowly through the resistor 24 producing an average output voltage, E out, of 0.05 FR (i.e., where R is the value of resistor 24) volts where F represents the frequency which is being measured.

It can be seen that the scale-factor of this circuit in volts output per Hertz input is insensitive to all parameters except the resistance of the feedback resistor 24, the capacitance of capacitor 14, and the 5 volt regulated precision voltage supply 100 used in charging capacitor 14. The magnitude of the capacitance, of capacitor 25, merely affects the time-constant and ripple of the output signal. Generally the ac ripple component of the output signal is a saw-tooth wave form with a peak-to-peak amplitude equal to the 5 volt regulated supply amplitude times the capacitance of the capacitor 14 divided by the capacitance of capacitor 25. Spikes in the output caused by switching transients can be reduced by adding a resistor (not shown) between the drain of FET 16 and the input of the operational amplifier 23.

The regulator portion of the precision voltage supply 100 will apply 6.8 volts to the scaling adjustment portion of the precision voltage supply which then scales the voltage down to 5 volts. A voltage of 6.8 volts was picked for the output voltage of the regulator because it appears that this is a neutral voltage point for the Zener diode with respect to temperature variations.

The voltage output of the source is further dropped to 5 volts by the voltage divider comprised of resistors 5 and 7. The proper selection of resistors to supply a precise minus 5 volts is the only calibration required of the system.

Having shown and described one embodiment of the invention, those skilled in the art will realize that many variations and modifications can be made to produce the described invention and still be within the spirit scope of the claimed invention.

What is claimed is:

1. A precise frequency measuring analog circuit for accurately measuring the frequency of an AC electronic signal comprising:
   a. first means for storing an electrical charge;
   b. means for charging said first storage means, said charging means responsive to positive half cycles of the AC electronic signal, said charging means charging said first storage means with a predetermined quantity of electrical charge during the positive half cycles of the AC electronic signals;
   c. means for switching coupled to said first storage means, said switching means being responsive to the negative half cycles of the AC electronic signal;
   d. second means for storing electrical charge coupled to said switching means, said second storage means receiving electrical charge from said first storage means during the negative half cycles of the AC electronic signal;
   e. means for receiving electrical charge received by said second storage means, said electrical charge reception means causing substantially all the electrical charge from said first storage means to be transferred to said second storage means during the negative half cycles of the AC electronic signal; and
   f. means coupled to said second storage means for converting the electrical charge received by said second storage means into a voltage signal.

2. A precise frequency measuring analog circuit as recited in claim 1 wherein said charging means includes a constant voltage source for charging said first storage means.

3. A precise frequency measuring analog circuit as recited in claim 1 wherein said switching means comprises a semiconductor diode.

4. A precise frequency measuring analog circuit as recited in claim 1 wherein said switching means comprises a semiconductor diode and a transistor coupled to each other so that the cathode of said diode is connected to a base of said transistor and an emitter of said transistor is coupled to said first electrical storage means and a collector of said transistor is coupled to said second storage means.

5. A precise frequency measuring analog circuit as recited in claim 4 wherein said transistor is of the FET-type.

6. A precise frequency measuring analog circuit as recited in claim 1 wherein said first and second storage means include capacitors.

7. The precise frequency measuring device recited in claim 1 wherein said electrical charge reception means comprises a resistor coupled to said second storage means, the current through said resistor substantially equal to the electrical charge transferred per unit time to said second storage means.

8. The precise frequency measuring device of claim 1 further including amplifying means for converting the AC electronic signal into a square wave of substantially identical frequency of the AC electronic signal.

9. The precise frequency measuring device of claim 1 wherein said charge control means comprises an operational amplifier.

10. A precise frequency measuring analog circuit for accurately measuring the frequency of an electronic signal comprising:
    a. first means for storing an electrical charge;
    b. a constant voltage source for charging said first storage means;
    c. first switching means having a conducting and a non-conducting electrical state, said first switching means responsive to the electronic signal for establishing the state of said first switching means, said first switching means coupled between said first storage means and said constant voltage source for charging with a predetermined quantity of electrical charge said first storage means when said first switching means is in the conducting state;
    d. second means for storing electrical charge;
    e. second switching means having a conducting and a non-conducting electrical state, said second switching means responsive to the electronic signal for changing the state of conduction of said second switching means, said second switching means coupled between said second storage means and said first storage means, said second switching means being in the non-conducting state when said first switching means is in the conducting state and vice-versa;
    f. an operational amplifier coupled to said second storage means for transferring charge substantially equal to the predetermined electronic charge of said first storage means to said second storage means each time said second switching means is switched to the conducting state; and
    g. conversion means coupled to said second storage means for converting electrical charge received by said second capacitor means into an electrical voltage, said electrical voltage being determined by a rate of transfer of the predetermined charge quantities to said second storage means.

11. A method for accurately measuring the frequency of an electronic signal comprising the steps of:
    a. alternately charging and discharging a first electrical storage device with a predetermined quantity of electrical charge for each complete period of the electronic signal;
    b. transferring for each period of the electronic signal a quantity of electrical charge substantially equal to the predetermined quantity of electrical charge that is discharged from the first electrical storage device into a second electrical storage device; and
    c. converting the predetermined quantity of charge transferred per unit time into a voltage signal.

* * * * *